United States Patent Office 3,245,945
Patented Apr. 12, 1966

3,245,945
CARBON BLACK DISPERSIONS
Frank W. Anderson, Jr., Concord, Robert J. Moore, Orinda, and John N. Wilson, Berkeley, Calif., assignors to Shell Oil Company, New York, N.Y., a corporation of Delaware
No Drawing. Filed Mar. 16, 1962, Ser. No. 180,348
4 Claims. (Cl. 260—33.6)

This invention relates to novel compositions of carbon black. More particularly, it relates to novel concentrates of carbon black in certain organic diluents.

Carbon black, of course, is a well-known constituent in a variety of chemical compositions. Carbon black is commonly blended with various ingredients to take advantage of its pigmenting qualities, its reinforcing capabilities, its lubricating characteristics, and still other applications. In such cases, it is very important to disperse the carbon black uniformly in the composition in which it is contained. As a consequence, there is considerable art devoted to the problem of dispersing carbon black. The importance of dispersing carbon black can perhaps be suitably illustrated by referring to elastomer compositions which are compounded with carbon black. Thus, it is well known that carbon black imparts strength to rubber stock while also serving as an extender. If the carbon black is not uniformly and/or suitably dispersed in the rubber stock, the tensile and other properties suffer considerably. Accordingly, it is vital in the compounding of rubber that the carbon black be uniformly and suitably dispersed. To accomplish the needed dispersion of carbon black, it is common practice to mill the solid rubber stock with added carbon black and other needed rubber chemicals, or additives, at elevated temperatures until the desired dispersion is obtained. Milling usually is on mill rolls or by Banbury mills and in either operation a severe shearing is involved which affects materially the properties of the product since the shearing causes, among other things, a reduction in the molecular weight of the rubber molecules. Milling is costly because the power requirements are great and it is time-consuming. Perhaps of equal importance as a cost factor is the considerably capital investment in milling equipment. In spite of these disadvantages, no suitable way was heretofore known to obtain the needed dispersion of carbon black in rubber without the milling operation.

It is an object of this invention to provide novel concentrates of carbon black. It is a more particular objective of this invention to provide such concentrates which are capable of being easily and suitably dispersed in certain synthetic elastomers. It is yet another object of this invention to provide novel concentrates of carbon black which are essentially free of dense agglomerates, which carbon black is particularly suitable for reinforcing synthetic elastomers. It is yet another object of this invention to provide processes for producing the easily dispersable concentrate of carbon black. It is still another object of this invention to eliminate entirely or reduce substantially the necessity for milling during the compounding of synthetic elastomers. Other objects will become apparent as the description of this invention proceeds.

These and other objects are accomplished by a composition of a gel of carbon black mixed in an organic diluent and from 0.5 to 50 percent by weight of the black of a cationic or nonionic polymeric surface active agent, the carbon black being present in excess of about 5% by weight of the diluent. When the composition of the gel of carbon black is mixed with an organic solution of a synthetic elastomer, the carbon black is found to be dispersed so thoroughly and uniformly upon recovery of the elastomer from the hydrocarbon solution that further efforts to disperse the carbon black, as by milling, are not entirely necessary but additional milling for a short period of time produces elastomer having considerably improved properties. This will be shown later in the examples.

It is an advantage of the present invention that the novel carbon black gels are simple to prepare in readily available apparatus. It is essential for the preparation of the novel carbon black composition that the initial mixture of the carbon black, polymeric surface active agent and diluent be subject to very high shear at a fast rate. The needed shearing may be provided on a small scale by apparatus such as a Waring Blendor, which may develop speeds in the order of 10,000–15,000 r.p.m. On a larger scale, the high shear may be provided by, for example, a Cowles dissolver, colloid mill or a high-speed centrifugal pump. Very suitable results will be experienced with a Cowles dissolver having an 8-inch blade rotating at 2700 r.p.m. The carbon black, the polymeric surfactant, and the diluent are merely charged to the high shearing apparatus in any order after which the mixture is subjected to the high shearing action. The time required to produce the gel will vary depending on the apparatus, the size of the batch and similar variables but in any case the time is not long and rarely requires as much as 60 minutes. For convenience of handling, it is useful to prepare a slurry of the carbon black and the surfactant in the diluent in a separate vessel after which the slurry may be transferred to the shearing apparatus by pumping or by gravity. The actual shearing apparatus that may be employed is not particularly critical providing the apparatus is capable of exerting sufficient shear to reduce the size of the dense aggregates of the carbon black initially present. Thus, in the above illustration concerning the Cowles dissolver, equivalent shearing may be attained by a larger blade rotating at a lower speed or a smaller blade rotating at a higher speed.

As previously indicated, the carbon black of the present concentrates are essentially free of dense aggregates. A characterization of the carbon black by particle size is not too suitable because the particle size is not the controlling feature. The individual aggregates are formed from a large number of ultimate particles; in the present case the aggregates have a large volume-fraction of voids whereas the original carbon black, or carbon black that is subjected to low shear, has a relatively small volume-fraction of voids, i.e., volume not occupied by carbon black. In the present case, an aggregation of about 10 to about 15 ultimate particles would just be large enough to be visible with a light microscope. Stated a different way, about 10 to about 15 ultimate particles are needed to form an aggregate which is microscopically visible and such particles or aggregates would be in the order of about 0.5 micron. However, a number of the fine particles, or aggregates of low density, may be random packed and still be suitable so that as many as several thousand particles may be contained in a suitable form. Thus, the particles are characterized by random packing. Further, the gels are thixotropic and, accordingly, are further characterized by reverting to a more fluid consistency by slow, gentle stirring. Reversion to the more fluid consistency may take place by permitting the gel to stand for several hours or more. When the composition reverts to the fluid, pourable form, the carbon black is then in the form of round, organized aggregates arranged in a chain-like formation wherein the particles have rather uniform size that ranges from about 10 to 20 microns. That product is wholly distinctive and apart from the novel carbon black concentrates of the present invention.

The use of the polymeric surface active agents provides other benefits. Thus, they do not adversely affect the subsequent use of the reinforcing blacks in the compounding of elastomers. More important, however, the use of the polymeric dispersing agents permits more carbon black to be contained in the composition, computed on the amount of organic diluent used. This is a considerable advantage because the organic diluent must ultimately be removed so that the surfactants that are employed reduce greatly the cost of recovering the diluent. This will be more readily seen hereinafter when the methods of incorporating the black in elastomers are discussed.

Because the novel compositions must be thixotropic when used, it follows that any treatment that hastens the reversion of the gel to the fluid consistency is not desirable. For this reason, it is much preferred to prepare the gel at temperatures from about 0–10° C. to about room temperature. During the preparation, the temperature may rise several degrees to as much as 35° C. or higher, but it is recommended that external heat not be applied. Because the gels, on standing, will revert to the watery form, it is the better practice to use the gels shortly after they are prepared. Another advantage of the present invention is that the gels are much more stable and can be stored or transported more readily without reversion taking place. In any case, a gel that has reverted to the fluid form is again made into the form of a gel by merely subjecting the watery fluid to high speed shear for a short period of time. It should be understood that the high shearing action needed to produce the carbon black gels must be capable of shearing action at very high speeds. Thus, ball mills and similar shearing apparatus simply are not suitable as they do not generate the required shear.

The particular cationic or nonionic polymeric surfactants selected are not critical. The choice, however, will be reflected in the amount that is employed. Further, it is much preferred, although not essential, that they be soluble in the diluent as better contact with the particle surfaces are obtained. The molecular weight of the polymeric surface active agents is not important either, but it is preferred that the polymer be of lower molecular weight mainly for solubility considerations. There are numerous suitable surface active agents that are available commercially under a variety of trade names. Among the nonionic surface active agents there may be mentioned the reaction product of nonyl phenyl polyethylene glycol ether and ethylene oxide, reaction product of dodecyl phenyl and ethylene oxide, reaction product of tall oil esters and ethylene oxide, allyl phenol polyoxyethylene esters, reaction product of tertdodecythioether and ethylene oxide; the e.g. capryl and octyl esters of phosphoric acid, esters of oleic acid and pentaerythritol, polyglycol esters of fatty acids, and many others.

Among the cationic surface active agents there may be mentioned amines as the copolymers of oleyl methacrylate, styrene and beta-diethylaminoethylmethacrylate and copolymers of lauryl methacrylate and dimethylaminoethylmethacrylate; pyridines as the copolymers of methylvinylpyridine, methyl methacrylate and stearyl or lauryl methacrylate; pyrrolidones as copolymers of N-vinylpyrrolidone and alkylmethacrylate and the copolymers of butadiene and vinylpyrrolidone; sulfonates as basic aryl alkyl sulfonates and carbonated aryl alkyl sulfonates; thiols as copolymers of stearyl methacrylate and 4-hydroxy-3-thiaamyl methacrylate; alcohols as the copolymers of stearyl methacrylate and 5-hydroxyamyl methacrylate and many others. In general, those additives which accept positive ions, and in particular hydronium ions, are most suitable for this invention.

Depending on such considerations as the nature of the diluent, the particular rubber reinforcing black, the ratio of black to diluent, and the particular surfactant, the amount of surfactant may vary from 0.5 to 50 parts per hundred of the carbon black. These variations will be shown in the examples.

As previously mentioned, the novel gels provide a particularly suitable means for dispersing carbon black in synthetic elastomers. One of the major advantages of the present invention is that the carbon black may be dispersed so thoroughly and with so little effort that milling or other processing which heretofore had been required to work the carbon black into the elastomer may be eliminated or greatly reduced. This aspect of utility, however, requires that the elastomer be in a form that is also suitable for the carbon black gel. Thus, the synthetic elastomer must be in solution in a normally liquid inert organic solvent before the gel of carbon black is applied. In that way, the solution of the synthetic elastomer is mixed with the novel carbon black concentrate and the black is dispersed in the elastomer before agglomeration of the black takes place. Synthetic elastomers that are in the form of solids need to be dissolved before blending with the carbon black gels but care must be taken not to degrade or otherwise damage the elastomer while dissolving it. Thus, in the preferred practice of this invention, the most suitable elastomers are those prepared by solution polymerization wherein the polymer is in solution and remains in solution throughout the polymerization. That is to say that the direct and immediate product of polymerization is a solution of the elastomer in an inert organic solvent or diluent. Among the synthetic elastomers that are suitable for use according to this invention, there may be mentioned cis-1,4-polyisoprene and cis-1,4-polybutadiene. These elastomers are all characterized in that they can be prepared by polymerizing the respective monomers in an inert organic diluent by solution polymerization methods. Other synthetic elastomers include trans-1,4-polybutadiene, trans-1,4-polyisoprene, and various mixtures thereof. Solution processes for preparing these synthetic elastomers are well known in the art, and detailed descriptions of the methods for preparing them are not provided here. The elastomeric copolymers of conjugated dienes and other polymerizable monomer are also suitable for use in the present processes. Thus, for example, butadiene-styrene copolymer, butadiene-acrylonitrile copolymers, and the like, can be dissolved in organic solvents for use in the present invention or they can be prepared by solution polymerization methods and the resulting product has improved properties over the product obtained by conventional methods for incorporating the reinforcing black. It is particularly noteworthy that the present invention is most suitable for use with saturated elastomers or with those that are only slightly unsaturated. In the category of saturated elastomers are the elastomeric copolymers of ethylene and one other mono-alpha-olefin having up to 6 carbon atoms such as elastomeric ethylene-propylene copolymer, ethylene-butene-1 copolymer and the like. A representative elastomeric that is slightly unsaturated is polyisobutylene.

The carbon black gel may be blended with the elastomer solution by any convenient means. Generally, it is preferred to move the gel out of the shearing apparatus and add it to a vessel containing the elastomer solution. As the gel is pumpable, or will flow by gravity, no particular problems will be encountered. Because the gel has much greater stability it may be pumped over longer distances as the fine particles of the carbon black will not tend to agglomerate as readily. When the elastomer solution and gel are combined, the mixture is stirred until a homogeneous blend is obtained.

In the more preferred procedures of this invention, the organic diluent used for the polymerization of the monomer to produce the elastomer solution and the organic diluent used for the preparation of the gel are the same. Normally liquid inert hydrocarbon solvents are preferred and the particular species depends mainly on the monomer which is to be polymerized by known methods. Thus, for elastomers of conjugated dienes, the solvent or diluent preferably is aliphatic with up to about 8 carbon atoms being a suitable maximum. Heptane and hexane are representative of the diluents in common use. Amylenes may be used with certain polymerization catalysts such as the alkyl lithiums. Aromatic solvents such as benzene and cycloalkanes as cyclohexane are also suitable and are especially preferred for the polymerization of butadiene with the so-called class of "soluble cobalt catalysts" described in Belgian Patent 579,689, which is representative of a prior art teaching. As the hydrocarbon solvent is ultimately separated, recovered and treated for reuse, the use of higher boiling diluents is not desirable so that there is no useful purpose to accomplish by using, for example, toluene when benzene is available. The procedures of this invention are particularly suitable for use with elastomeric copolymers of ethylene and one other olefin having up to 6 carbon atoms, such as elastomers of ethylene and propylene. These copolymers, for some unknown reason, have a strong tendency to agglomerate the carbon black particles in the absence of the surfactants of this invention. By the present invention that strong tendency is so greatly reduced so as to permit less elaborate material handling apparatus.

The use of polar diluents presents different considerations insofar as the gel are concerned. Generally, the gels are not as stable in such media so that they will need to be used fairly soon after their preparation. A particularly useful embodiment of the invention comprises incorporating extending oil into the elastomer by the processes described above. It is surprisingly found that gels can be prepared in the presence of an extending oil, providing the surfactant is oil-soluble. The oil may be used in whole or in part for the inert diluent previously described. The oil, in such cases, is both a diluent for the gel and a functioning component in the entire elastomer composition. The extending oil, or "compatible oil," will not be separated when the elastomer is recovered as a solid crumb providing the recovery procedure is limited to flashing the solvent from the elastomer solution. The oils that may be used for this purpose are any of the well-known rubber extending oils such as the naphthenic, aromatic and highly aromatic types which are well known in the art.

After a homogeneous blend of the elastomer solution and the carbon black suspension is obtained, the coagulation of the elastomer, as a solid, is undertaken. The coagulation results in a solid elastomer having the finely divided carbon black uniformly and thoroughly dispersed. Coagulation may be accomplished by any of several means such as by adding a non-solvent as a lower alcohol, a ketone, or the like, to the blend. Another common procedure is to flash the diluent with hot water and/or steam whereupon the elastomer containing the carbon black is recovered as a water-wet crumb which is recovered and dried. The dried product, as previously indicated, does not require further processing in order to disperse the carbon black. In actual practice, however, some milling or similar treatment is highly desirable in order to blend into the elastomeric composition other ingredients which are needed in order to give useful products. Those ingredients, which are referred to as "rubber additives" include vulcanizing agents such as sulfur and sulfur-bearing components as tetramethyl thiuram disulfide, selenium diethyl dithiocarbamate, dipentamethylene thiuram tetrasulfide, and the like; secondary vulcanizing agents as selenium and tellurium; accelerators as benzothiazyl disulfide, mercaptobenzothiazole, zinc mercaptobenzothiazole, and the like; accelerator activators as zinc oxide, magnesium oxide, and the like; antioxidants as phenyl-beta-naphthyl amine, diphenyl-p-phenylene-diamine, and the like. Still other rubber additives as plasticizers, softeners, tackifiers, fillers, diluents, colors, and the like, are included. Blending these ingredients into the elastomer, however, is not difficult and is easily accomplished, by milling or the like, in comparison to the prior techniques needed to blend the carbon black into the elastomer. A particularly outstanding advantage of the present invention is that all rubber additives may be incorporated into the elastomer in the same way that the carbon black is added so that a milling or a Banbury operation is less necessary. If desired, the gel of carbon black may be prepared in the presence of rubber additives of the kind mentioned above so that the gel contains these additional ingredients. Alternatively, solutions or suspensions of the rubber additives may be prepared separately from the gel of carbon black and the solution or suspension is added to the elastomer solution. The gel of carbon black is added separately but the blend of elastomer solution, gel of carbon black, and the solutions or suspensions of the other rubber additives are coagulated as a single entity and the resulting product, after removal of the diluent and non-solvent, is ready for vulcanization with a minimum of further treatment. Additional milling produces further improved physical properties and this will be shown in the examples.

The quantity of the finely divided carbon black that is mixed with the elastomer solution depends solely on the rubber formulation that it is desired to produce, and it is only a matter of arithmetic to determine how much of the gel is to be blended with the elastomer solution. The same thing applies to the amounts of other rubber additives that it is desired to add to the elastomer composition. For example, if it is desired to produce a composition having 50 parts by weight of a carbon black to 1 part by weight of a peptizer, as di-o-benzamide-phenyl sulfide, based on 100 parts of the elastomer, then the two may be added to the elastomer solution in these relative proportions. The black is added in the form of the novel gel and the peptizer is added in the form of a solution. Alternatively, the peptizer or other additives may be added to the carbon black and the gel would then contain the rubber additives. In a similar manner, antioxidants, curing agents as sulfur, accelerators and other rubber chemicals as titanium dioxide are calculated based on the relative proportions that are to be contained in the elastomeric composition.

There are other benefits and advantages afforded by the present method of incorporating carbon black into the elastomer solution. In the main, the carbon black is dispersed into the elastomer faster and at lower cost. For particular types of elastomers the invention obviates particular disadvantages that existed heretofore. This can be illustrated by referring to the stereospecific elastomer of isoprene usually containing in the order of 88–95% of the cis-1,4-addition. These products are well known in the art and resemble natural rubber in molecular structure. It differs from natural rubber, of the Hevea variety, in that it is free of branching and gel and does not contain the variety of naturally occurring substances such as proteins, fats, minerals and the like. The synthetic elastomer heretofore had some disadvantages when compared to natural rubber when used in the fabrication of automobile tires. Among the disadvantages was a higher hysteresis heat buildup and lower resilience. Substantial and significant improvements in these properties are attained by the present invention not only for the cis-1,4-polyisoprene but for most elastomers in general. Additionally, considerable improvement in the processability of elastomers that are deficient in that characteristic will be experienced.

The invention is described in greater detail in the examples which follow. Example I illustrates the preparation of the novel composition of carbon black and the surface active agents and the remaining examples are directed to elastomeric compositions containing the compositions.

EXAMPLE I

In these experiments, the high shear device is a Waring Blendor equipped with an explosion-proof motor. To the Blendor is added a suspension containing 20% by weight of high abrasive furnace black (HAF) pellets in hexane. Thereafter varying amounts and kinds of surfactants are added. The contents of the Blendor are sheared until cavitation occurs, which is a matter of several seconds to a few minutes. The consistency of the resulting gel is noted and for those gels that are mobile, additional carbon black may be used without increasing the amount of surface active agent. Where the gel is too viscous, the viscosity may be reduced by increasing the proportion of surfactant.

| Run | Surfactant | Amount, parts/100 HAF | Consistency of Slurry |
|---|---|---|---|
| 1 | Copolymer of alkylmethacrylates and methyl vinyl pyridines, m.w. About 200,000. | 2<br>4<br>a 6<br>b 6 | Slightly viscous.<br>Mobile liquids.<br>Slightly viscous.<br>Viscous. |
| 2 | Nonyl phenyl polyethylene glycol-ethylene oxide reaction product. | 5<br>10<br>20<br>b 20 | Viscous.<br>Slightly viscous.<br>Mobile liquid.<br>Viscous. |
| 3 | Dodecyl phenol-ethylene oxide reaction product. | 5<br>10 | Viscous.<br>Slightly viscous. |
| 4 | Polyoxyethylene thioether | 5<br>10 | Slightly viscous.<br>Mobile liquid. |
| 5 | Oil soluble alkylaryl sulfonates. | 5<br>b 5<br>c 5 | Mobile liquid.<br>Slightly viscous.<br>Viscous. | a 10% Additional HAF.
b 15% Additional HAF.
c 20% Additional HAF.

EXAMPLE II

For this example 5% by weight solution of elastomeric ethylene-propylene copolymer in heptane (I.V. 3.0 and 63.0 mole percent ethylene) is used. To the elastomer solution is added 50 phr. of a gel of HAF carbon black which is prepared in a Waring Blendor. Additionally, curatives dissolved in a minimum of solvent are also added. The resulting blends, with and without the surfactants of this invention, are coagulated by feeding the blend into hot water whereupon the elastomer coagulates. After drying, specimens are vulcanized, with and without additional milling. The results are tabulated in Table I wherein the specimens are vulcanized at 153° C. for 70 minutes.

From the resulting vulcanizates a comparison of the effect of the variables can be established.

Table II

| Run | 1 | 2 | 3 |
|---|---|---|---|
| Surfactant/phr | None | a 2.5 | b 3.0 |
| Carbon Black (HAF) in gel, parts/100 hexane | 15 | 20 | 20 |
| Viscosity of HAF gel | Thick | Normal | Normal |
| Vulcanizate Properties: | | | |
| Tensile, p.s.i | 1,430 | 3,460 | 3,440 |
| 300% Modulus, p.s.i | 1,280 | 1,390 | 1,400 |
| Percent Elongation | 320 | 600 | 600 |
| Hardness, Shore A | 67 | 67 | 65 | a Copolymer of mixed alkylmethacrylates and methylvinylpyridines.
b Oil soluble alkyl aryl sulfonate.

From the table it will be seen that Run No. 1 is by comparison, poor. In Runs 2 and 3, excellent products are obtained with high carbon black loadings.

It will be readily appreciated from the foregoing description that numerous modifications may be undertaken without departing from the spirit of the invention.

We claim as our invention:

1. The process comprising blending a hydrocarbon solution of an elastomer and a gel of carbon black in a normally liquid organic diluent, the gel containing in excess of 5% by weight of carbon black and from 0.5 to 50.0 parts by weight per hundred parts of the black of a member selected from the group consisting of polymeric cationic and polymeric nonionic surface active agents, the said gel being characterized as being thixotropic and reverting to a slurry of fluid consistency on agitation, the carbon black of the reverted form having a particle size of about 10–20 microns wherein the particles are formed into essentially round organized aggregates arranged in a chain-like formation when viewed under magnification of 230×, and thereafter recovering a solid composition of the elastomer and carbon black.

Table I

| Curative, phr. | | Other Additive | Diluent | Stress-Strain Properties | | | | | |
|---|---|---|---|---|---|---|---|---|---|
| | | | | Without Milling | | | 10 min. Milling | | |
| Dicumul Peroxide | Sulfur | | | $T_B$ | $M_{300}$ | Percent $E_B$ | $T_B$ | $M_{300}$ | Percent $E_B$ |
| 4.0 | 1.0 | None. | Heptane | 1,440 | 1,400 | 290 | 2,770 | 1,280 | 475 |
| 3.75 | 1.0 | None. | Benzene | 1,670 | 900 | 470 | 2,880 | 970 | 590 |
| 4.0 | 1.0 | a 0.6 phr. | Benzene | 2,330 | 1,270 | 450 | 3,110 | 1,150 | 540 |
| 4.0 | 1.0 | b 10.0 phr. | Benzene | 2,600 | 1,530 | 480 | 3,420 | 1,310 | 520 |

$T_B$=tensile strength, p.s.i.; $M_{300}$=300% modulus; Percent $E_B$=elongation at break percent.
All using ASTM Die D specimens.
a Copolymer of mixed alkylmethacrylates and methylvinyl pyridines.
b Nonionic copolymer of nonyl phenyl polyethylene glycol ether and ethylene oxide, mole ratio 1:4.

Another impressive observation is that the carbon black gel is much better dispersed and stays dispersed much longer when the surfactants are used with the elastomer copolymers. When the gel does not contain the surfactant, inferior products are obtained as will be seen from the above table.

EXAMPLE III

For these experiments 92% cis-1,4-polyisoprene is used. The carbon black gel is prepared as described above after which it is added to a solution of the elastomer and the resulting blend is treated to recover the solid rubber stock. Thereafter the rubber is milled with the following ingredients added during the milling cycle:

| | Phr. |
|---|---|
| Stearic acid | 4 |
| Zinc oxide | 5 |
| Sulfur | 2½ |
| Cyclohexyl benzothiazolesulphenamide | 1 |

2. The process of claim 1 in which the elastomer is ethylene-propylene copolymer.

3. The process of claim 1 in which the surface active agent is a copolymer of alkylmethacrylates and methylvinylpyridines.

4. The process comprising blending a hydrocarbon solution of elastomer ethylene-propylene copolymer and a gel of carbon black in a normally liquid organic diluent, the gel containing an excess of 5% by weight of carbon black and from 0.5 to 50.0 parts by weight per hundred parts of the black of a copolymer of alkylmethacrylates and methylvinylpyridines, the said gel being further characterized as being thixotropic and reverting to a slurry of fluid consistency on agitation, the carbon black of the reverted form having particle sizes from about 10–20 microns wherein the particles are formed into essentially round organized aggregates arranged in a chain-like formation when viewed under magnification of 230×, and thereafter recovering a solid composition of the elastomer and carbon black.

References Cited by the Examiner

UNITED STATES PATENTS

| | | | |
|---|---|---|---|
| 2,813,040 | 11/1957 | Rowe | 106—307 |
| 2,816,046 | 12/1957 | Damusis | 106—307 |
| 2,860,103 | 11/1958 | Buchanan et al. | 252—316 |
| 2,867,540 | 1/1959 | Harris | 106—307 |
| 2,952,656 | 9/1960 | Zomlefer | 260—41 |
| 3,032,430 | 5/1962 | Heller | 252—314 |
| 3,042,649 | 7/1962 | Hawkins et al. | 260—41 |
| 3,085,988 | 4/1963 | Hull | 260—34.2 |
| 3,136,695 | 6/1964 | Tansey | 252—316 |

FOREIGN PATENTS 158,769    9/1954    Australia.

MORRIS LIEBMAN, *Primary Examiner.*

ALEXANDER BRODMERKEL, *Examiner.*